Figure 1:
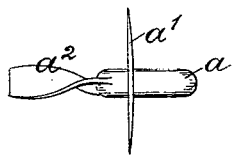

(No Model.)

W. BROOKES.
VALVE FOR INFLATING PNEUMATIC TIRES.

No. 590,474. Patented Sept. 21, 1897.

Fig. 3ᵃ.  Fig. 3ᵇ.

Fig. 4ᵃ.

Witnesses
F. W. Wright
M. H. Miles

Inventor
Warwick Brookes,
By his Attorneys
Howson & Howson

THE NORRIS PETERS CO., PHOTO-LITHO., WASHINGTON, D. C.

UNITED STATES PATENT OFFICE.

WARWICK BROOKES, OF MANCHESTER, ENGLAND.

VALVE FOR INFLATING PNEUMATIC TIRES.

SPECIFICATION forming part of Letters Patent No. 590,474, dated September 21, 1897.

Application filed August 7, 1896. Serial No. 602,084. (No model.)

*To all whom it may concern:*

Be it known that I, WARWICK BROOKES, a subject of the Queen of Great Britain, residing at Manchester, in the county of Lancaster, England, have invented Improvements in and Relating to Valves for the Inflation of Pneumatic Tires, of which the following is a specification.

This invention relates to the valves of the inflatable tubes or bladders of pneumatic tires for wheels, the object of the invention being to provide a simple and cheap valve through which the air can pass inward very readily, but which can be closed absolutely air-tight after inflation.

The valve proper is made entirely of india-rubber or similar suitable elastic material. The inner end of the valve is in the form of a flattened tube or a flattened and twisted tube, such as described in the specification of Letters Patent granted to me in the United States of America, No. 564,502, dated July 21, 1896. The outer end is open and circular in section inside and cylindrical or of other convenient form outside, and extends for a suitable distance beyond a broad external flange formed thereon by which the valve is attached to the outside of the inflatable tube or bladder. Thus the flattened end is inside the tube or bladder and the outer part of the cylindrical or open end projects outside the same. This projecting end is passed through and may be fixed in a hole made through the rim or felly of the wheel, forming an undilatable socket, or into an undilatable tube fixed to the said rim or felly, and is thus held in place.

The nozzle of the inflater may be inserted into the open end of the valve proper or screwed or otherwise fixed on the surrounding undilatable tube or to that part of the rim or felly which surrounds the open end of the said valve.

During inflation the flattened or flattened and twisted end of the valve admits the air to the inflatable tube or bladder quite freely, but acts quite sufficiently as a back-pressure valve, but after inflation the open or tubular end of the valves is closed to preclude the possibility of leakage. This may be effected by inserting a spigot into the open end of the valve and expanding the same inside the undilatable socket through which it is passed, as above described. Part of the cylindrical or open end of the valve is inside the inflatable part of the tire, and the spigot should be long enough to pass into this part of the valve, so that the pressure of the air tends to hold the spigot, as well as the pressure of the rubber, in the undilatable socket. The spigot may be shortened and provided with a cap at its outer end which is screwed or otherwise fastened to the undilatable tube above described or to the rim or felly to prevent the spigot from coming out of the end of the valve; or the spigot may be dispensed with and the cap tightened down upon the open end of the valve, which in this case must project through its undilatable socket (which must also be rigid) in such a way as to make an air-tight joint with the cap and between the latter and the rigid socket, so that no air can possibly escape between the socket and the outside of the tubular extension or end of the valve proper.

To deflate the tire, a small tube may be used or a suitable wire or light rod twisted in spiral form or made with a longitudinal or spiral groove or grooves or even square or round in section, but it must be of sufficient length to expand the flattened or flattened and twisted end of the valve.

The spigot above named may be tubular and closed air-tight by a screw-cap or equivalent device, the spigot being long enough to open out the inner end of the valve when required.

The accompanying drawings illustrate several ways of carrying my invention into practice.

Figure 2:
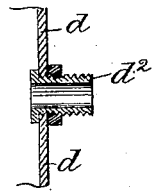
Figure 3:
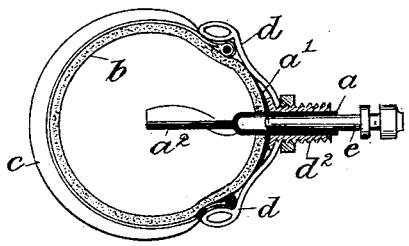
Figure 4:
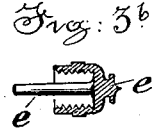
Figure 4:
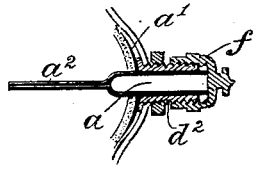
Figure 5:
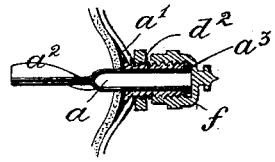
Figure 5:
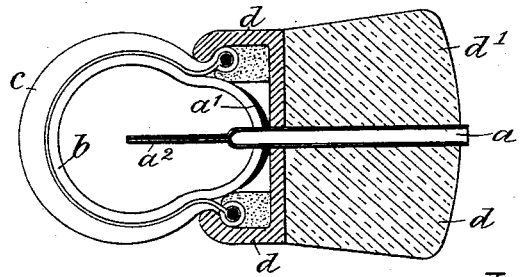

Figure 1 is an external view of the valve proper. Fig. 2 is a sectional view of part of the rim or felly of a wheel for velocipedes, bath-chairs, and for other vehicles to which wheels with light metal rims forming the felly are applied. Fig. 3 is a horizontal section through about the central part of the rim or felly of such a wheel with a pneumatic tire applied thereto and provided with my improved valve, the tire being inflated and the valve in the act of being closed by a spigot. Fig. 3ª shows the spigot for closing the valve detached. Fig. 3ᵇ shows a detached spigot provided with a cap, the latter being in section. Figs. 4 and 4ᵃ show how the valve can be closed by a cap alone. Fig. 5 shows in horizontal section, similar to Fig. 3, the application of my invention in the case of wheels having wooden fellies, say for carts or road-carriages.

The valve proper is marked $a$ $a'$ $a^2$, $a$ being the open end, $a'$ the flange by which it can be fixed by cementation and vulcanized to the tube or bladder $b$. $a^2$ is the inner end, which may be simply flattened, as seen at Figs. 4 and 5, but which I prefer to make flattened and twisted in spiral form, as seen at Figs. 1, 3, and 4ᵃ.

The cover $c$ of the tire may be applied and secured in any known way to the rim $d$ of the wheel, and the rim $d$ may surround a wooden felly $d'$, as seen at Fig. 5. In any case the projecting end of the part $a$ of the valve proper is passed through a hole in the rim $d$ and through the wooden felly $d'$ in cases where the rim $d$ is applied to such felly $d'$.

In some cases, especially where no wooden felly is used, I provide a rigid undilatable tube or socket $d^2$, fixed to or otherwise forming part of the rim $d$ (see Figs. 2, 3, 4, and 4ᵃ) of the felly, and I prefer to form a screw-thread upon this socket $d^2$, as shown, so that the nozzle of an ordinary inflater can be screwed thereon, and, further, a cap, such as $e'$, Fig. 3ᵇ, or $f$, Figs. 4 and 4ᵃ, can be screwed thereon.

When the tire has been inflated, a spigot $e$, which is slightly tapered, as shown, can be pushed into the open end $a$, which it expands and forces against the inner side of the socket $d^2$, and thus the spigot will be firmly held in the part $a$, and no air can escape through the valve if any should leak through the flattened end $a^2$.

In the case shown at Fig. 3 the spigot $e$ should be pushed in to pass beyond the flange $a'$ into the inflatable part $b$ of the tire, so that the compressed air will assist in holding the spigot in place.

The spigot $e$ may be held in place by a cap $e'$, (see Fig. 3ᵇ,) which can be screwed or otherwise secured to the socket $d^2$, or the spigot need not be used, but a cap $f$ may be employed instead, (see Figs. 4 and 4ᵃ,) the said cap being tightened against the open end of the part $a$ of the valve proper. The open end of the part $a$ may be made with a slight shoulder at $a^3$, (see Fig. 4ᵃ,) which is squeezed tightly between the open end of the socket $d^2$ and the closed end of the cap to further insure the complete closing of the end $a$ air-tight.

I claim as my invention—

1. A valve for pneumatic tires for wheels made of elastic material with one end flattened, and if preferred, twisted also, and the other end tubular and provided with a suitably-broad flange by which it is fixed to the inflatable part of the tire, the flattened end of the valve, as well as part of the open end being inside the inflatable part of the tire, with a spigot held in place in and closing the outer end of the valve, substantially as and for the purpose set forth.

2. A valve of elastic tubular material fixed to the inflatable part of the wheel-tire, the end inside the said tire being closed by flattening, and if preferred by twisting also, and the outer end being open and projecting from the inflatable part of the tire, in combination with an undilatable tubular socket, and means cooperating with the undilatable socket for compressing the tubular end of the valve against the undilatable socket to form a secondary air-tight closure of the open end of the valve, substantially as hereinbefore described.

3. The valve $a$, $a'$, $a^2$ the inflatable part $b$ of the tire, the socket fixed to the rim and surrounding the projecting part $a$ and spigot $e$ substantially as hereinbefore described and illustrated.

4. The valve $a$ $a'$ $a^2$ the inflatable part $b$ of the tire the socket fixed to the rim and surrounding the projecting part $a$, spigot $e$ and cap $e'$, substantially as hereinbefore described and illustrated.

In testimony whereof I have signed my name to this specification in the presence of two subscribing witnesses.

WARWICK BROOKES.

Witnesses:
CHARLES A. DAVIES,
JNO. HUGHES.